United States Patent

Vlasak

[11] Patent Number: 5,108,061
[45] Date of Patent: Apr. 28, 1992

[54] ADJUSTABLE STAND

[76] Inventor: Miroslav J. Vlasak, 13215 65A Avenue, Surrey, British Columbia V3W 7Y3, Canada

[21] Appl. No.: 629,071

[22] Filed: Dec. 17, 1990

Related U.S. Application Data

[63] Continuation of Ser. No. 355,564, May 23, 1989, abandoned.

[30] Foreign Application Priority Data

Jun. 17, 1988 [CA] Canada .................... 569788

[51] Int. Cl.$^5$ ............................................. F16M 11/00
[52] U.S. Cl. ................................ 248/162.1; 248/280.1; 248/292.1
[58] Field of Search ............... 362/269, 274, 285, 288, 362/401, 402, 410, 413, 418; 248/280.1, 297.1, 292.1, 162.1

[56] References Cited

U.S. PATENT DOCUMENTS

| | | | |
|---|---|---|---|
| 1,823,535 | 9/1931 | Frutkow et al. | 362/402 |
| 1,851,199 | 3/1932 | Mayer | 362/388 |
| 2,037,435 | 4/1936 | Reichenbach | 174/70 R |
| 2,133,923 | 4/1936 | Perlmutter | 285/282 |
| 2,242,303 | 11/1939 | Irmischer | 285/282 |
| 2,543,926 | 3/1951 | Mounique | 362/347 |
| 2,608,367 | 8/1952 | Boltuch | 362/413 |
| 3,037,799 | 9/1959 | Mulac | 285/282 |
| 3,188,460 | 6/1965 | Thorsen et al. | 362/401 |
| 3,247,370 | 4/1966 | Lynn | 362/410 |
| 3,265,341 | 8/1966 | Ruder | 248/590 |
| 3,409,767 | 11/1968 | Entwistle | 362/401 |
| 3,543,019 | 11/1970 | Jacobsen | 362/402 |
| 3,652,848 | 3/1972 | Miller et al. | 362/218 |
| 3,983,386 | 9/1976 | Schallenkammer | 362/427 |
| 4,165,530 | 8/1979 | Sowden | 248/280.1 |
| 4,545,555 | 10/1985 | Koch | 248/280.1 |
| 4,770,384 | 9/1988 | Kuwazima et al. | 362/402 |
| 4,846,434 | 7/1989 | Krogsrud | 248/280.1 |

FOREIGN PATENT DOCUMENTS

| | | | |
|---|---|---|---|
| 509815 | 3/1952 | Belgium | 248/292.1 |
| 452486 | 11/1948 | Canada | 248/280.1 |
| 9303 | 4/1980 | European Pat. Off. | |
| 1111289 | 7/1961 | Fed. Rep. of Germany | 248/292.1 |
| 2148093 | 10/1970 | Fed. Rep. of Germany | |
| 2516142 | 10/1976 | Fed. Rep. of Germany | |
| 2535607 | 2/1977 | Fed. Rep. of Germany | |
| 2742781 | 4/1978 | Fed. Rep. of Germany | |
| 2658888 | 6/1978 | Fed. Rep. of Germany | |
| 3003217 | 8/1980 | Fed. Rep. of Germany | |
| 3101367 | 11/1982 | Fed. Rep. of Germany | |
| 3208805 | 9/1983 | Fed. Rep. of Germany | |
| 221551 | 7/1968 | Sweden | |
| 309449 | 3/1969 | Sweden | |
| 386250 | 8/1976 | Sweden | |
| 543704 | 12/1973 | Switzerland | |
| 631480 | 11/1949 | United Kingdom | 362/413 |
| 1547389 | 6/1979 | United Kingdom | |
| 1549575 | 8/1979 | United Kingdom | |
| 1556124 | 11/1979 | United Kingdom | |

Primary Examiner—Ira S. Lazarus
Assistant Examiner—Sue Hagarman
Attorney, Agent, or Firm—J. F. McLellan

[57] ABSTRACT

An adjustable stand comprising a base with a pair of upstanding, spaced parallel friction plates having an upstanding arm with a lower end pivotally attached between the friction plates and an upper end connected to a supported load. The lower end of the arm has a friction member adapted to engage the friction plates. A counterbalancing tension spring extends between the arm and the base to substanatially balance the weight of the arm and the supported load whereby the counterbalancing spring and the friction member act to ensure tht the upstanding arm with its supported load will remain at any position to which the upstanding arm is pivoted.

9 Claims, 2 Drawing Sheets

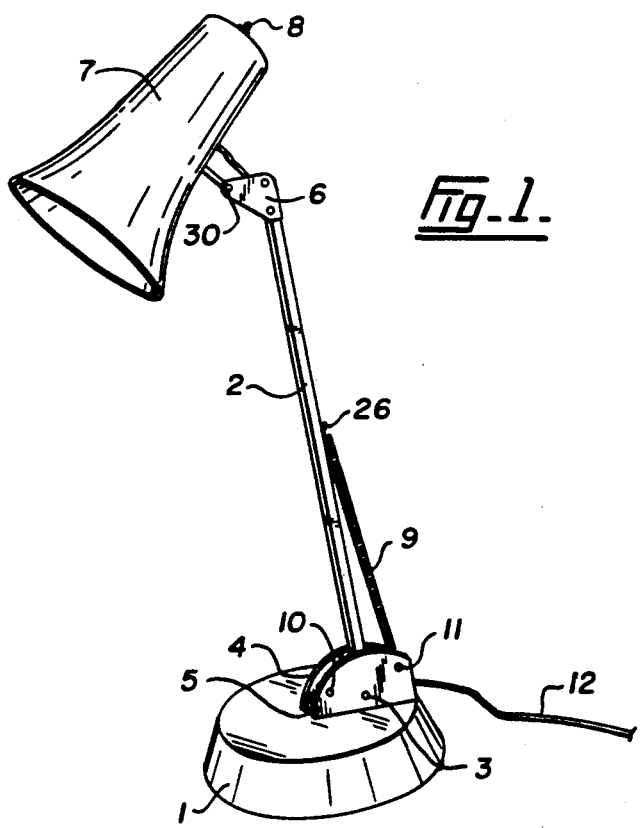
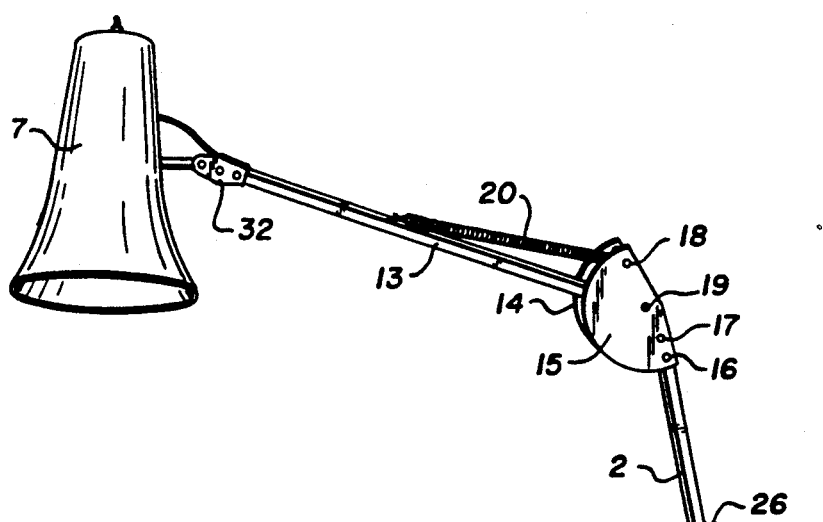
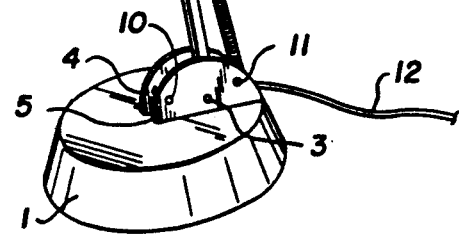

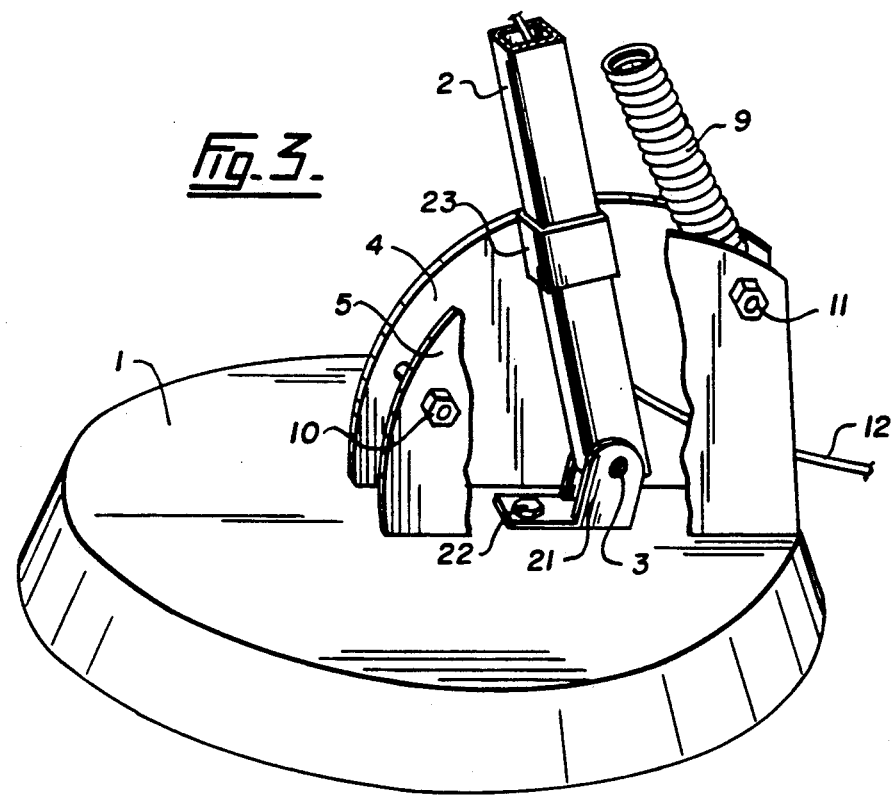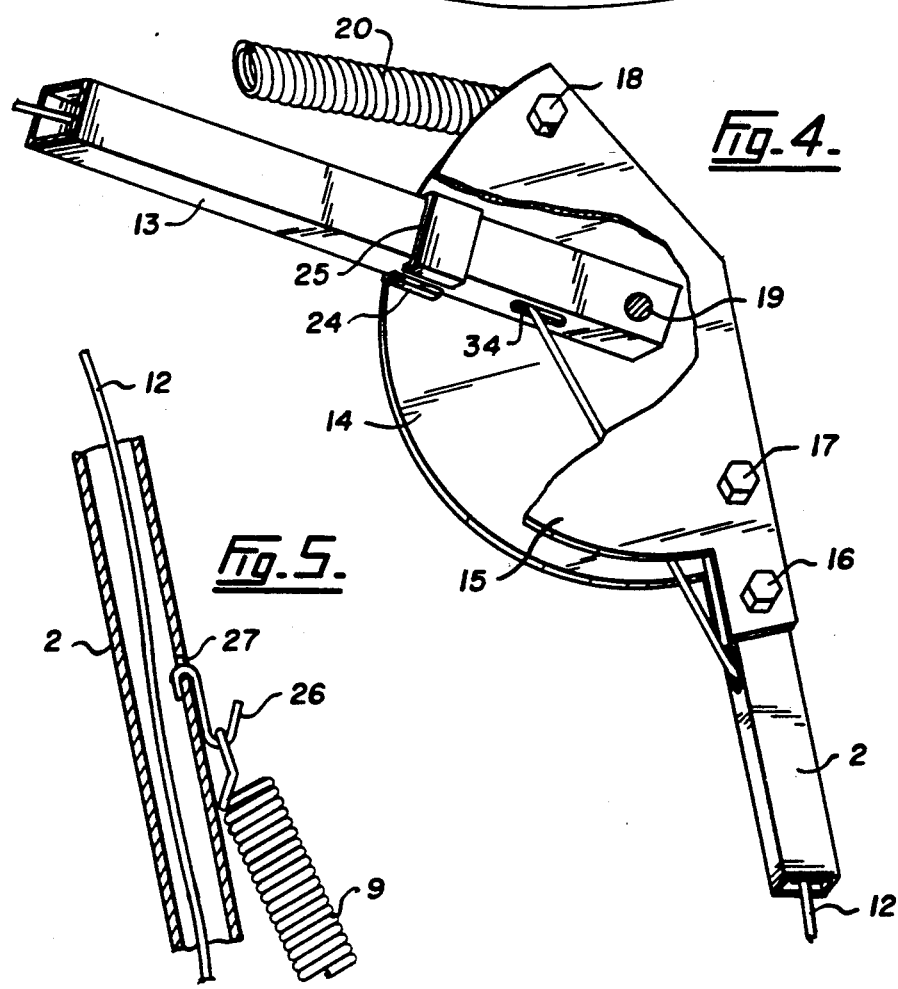

ADJUSTABLE STAND

This is a continuation of copending applications Ser. No. 07/355,564 filed on May 23, 1989 now abandoned,

FIELD OF THE INVENTION

This invention relates to an adjustable stand particularly useful for supporting a lamp housing.

DESCRIPTION OF THE PRIOR ART

Adjustable stands for supporting lamps and the like are well known. A popular style of desk lamp in common use today comprises a heavy base with an upwardly extending arm comprising an elongated parallelogram pivotally mounted to the base. A lamp housing comprising a lamp shade with a bulb socket is attached to the upper shorter side of the parallelogram. Two tension springs extend across the parallelogram on opposite sides of the arm to counterbalance the weight of the lamp housing and the arm. One can change the position of the lamp housing by exerting a gentle pressure on the arm. The adjusted position remains stable without involving the use of locking devices.

Numerous other types of adjustable stands for use with lamp housing exist. Examples of these structures can be found in the following patents:

U.S. Pat. No. 2,133,923 to Perlmutter
U.S. Pat. No. 3,652,848 to Miller et al.
U.S. Pat. No. 2,242,303 to Irmischer
German OS 31 01 367
German OS 21 48 093
German OS 32 08 805
German OS 30 03 217
German OS 27 42 781
German OS 25 35 607
British Patent 1,547,389
Swiss Patent 543,704
European Patent Application 009,303 A1.

SUMMARY OF THE INVENTION

The present invention provides an adjustable stand for supporting a lamp housing and the like that uses the counterbalanced design of the conventional parallelogram desk lamp. However, the present invention uses a simpler construction that requires fewer parts so as to be cheaper to manufacture. In addition, the adjustable stand of the present invention provides a less cluttered and more streamlined shape.

Accordingly, the present invention is an adjustable stand comprising:

a base with a pair of upstanding, spaced parallel friction plates;

an upstanding arm having a lower end pivotally attached between said friction plates and an upper end connected to a supported load, the lower end of said arm having a friction member adapted to engage said friction plates;

counterbalancing means extending between said arm and said base to substantially balance the weight of said arm and said supported load;

whereby said counterbalancing means and said friction member act to ensure that said upstanding arm with its supported load will remain at any position to which said upstanding arm is adjusted.

In a first embodiment, the adjustable stand uses a single counterbalanced arm to support a lamp housing.

In a second embodiment, a second counterbalanced arm supporting a lamp housing is pivotally attached atop a first counterbalanced arm creating a lamp with a wide variety of adjustable positions.

DESCRIPTION OF THE DRAWINGS

Various embodiments of the present invention are shown in the accompanying drawings, in which:

FIG. 1 is a pictorial view of the adjustable stand of the present invention with a single counterbalanced arm supporting an attached lamp housing.

FIG. 2 is a pictorial view of a second embodiment of the present invention using two counterbalanced arms to support an attached lamp housing.

FIG. 3 is a sectioned view of the connection between the base and the lower arm of the adjustable stand of FIGS. 1 and 2.

FIG. 4 is a sectioned view of the connection between the first arm and the second arm of FIG. 2.

FIG. 5 is a sectioned view showing the connection of a tension spring with an arm.

DESCRIPTION OF THE PREFERRED EMBODIMENTS

Referring to FIG. 1 of the drawings, there is shown a first embodiment of the adjustable stand of the present invention comprising a relatively massive base 1 and a pivotable counterbalanced arm 2 supporting a lamp housing of conventional construction including a shade 7 within which is mounted a socket assembly (not shown) having a switch 8. The lamp housing is attached to the upper end of arm 2 by a bracket 6 which allows for pivoting of shade 7 about point 30.

Attached to base 1 is a pair of upstanding, spaced parallel plates 4 and 5. As best shown in FIG. 3, arm 2 extends into the space between plates 4 and 5 and is pivotally mounted about pin 3 which extends perpendicularly between the plates. If desired, a mounting bracket 21 attached to base 1 by screw 22 can be used to support the lower end of arm 2. Plates 4 and 5 are also interconnected by adjustment means comprising threaded fasteners 10 and 11. A tension spring 9, having one end hooked about fastener 11 and its opposite end hooked into arm 2, acts to counterbalance the weight of the lamp housing and the arm such that the stand will remain in any position to which it is adjusted. In addition, to assist in maintaining an adjusted position, arm 2 is fitted with a friction member comprising sleeve 23 that engages the inner edges of plates 4 and 5 so as to provide a relatively tight but movable friction fit. Sleeve 23 may be a single piece or may be constructed from two U-shaped pieces 24 and 25 as shown in FIG. 4.

Preferably, arm 2 of the adjustable stand is a hollow tube of square cross-section. Such a shape allows wire 12 of the lamp housing to be led through the interior of arm 2 to provide a neat appearance and avoid possible entanglement of the wire. In this regard, as shown in FIG. 5, tension spring 9 is attached to arm 2 using hook 26 in slot 27 formed in the arm so that the interior of the arm is left open for passage of wire 12.

In use, the friction between sleeve 23 and friction plates 4 and 5, and the force of tension spring 9 cause arm 2 to remain at the position to which it is moved. A slight force is all that is required to move the arm to a new position. Screw fasteners 10 and 11 provide stops to limit the range of motion of arm 2. In addition, fasteners 10 and 11 can be tightened or loosen in order to adjust the distance between friction plates 4 and 5 so as to vary the force needed to move arm 2. It should be emphasized that fasteners 10 and 11 are not used to lock the arm into a fixed position, rather they provide a means to vary the applied force necessary to move the arm.

FIG. 2 shows a second embodiment of the present invention that includes a second counterbalanced arm 13 mounted to the upper end of arm 2. The lower arm of the embodiment of FIG. 2 is identical to the arm of FIG. 1 and is attached to base 1 in an identical manner.

At the upper end of the lower arm 2, there are mounted a second pair of friction plates 14 and 15 between which is pivotally mounted arm 13 at pin 19. The opposite end of arm 13 supports a conventional lamp housing at bracket 32.

FIG. 4 provides a detailed view of the joint between arm 2 and arm 13. Friction plates 14 and 15 are attached to arm 2 by screws 16 and 17. Threaded fastener 18 extends perpendicularly between the plates and serves a variety of functions. The fastener provides an anchor point for tension spring 20 extending between the friction plates and arm 13. As in the embodiment of FIG. 1, spring 9 is attached to arm 13 in an identical manner using a hook 26. Fastener 18 also acts as adjustment means to vary the distance between the plates in order to vary the frictional force on arm 13. In addition, fastener 18 acts as a stop to limit the movement of arm 13 in a range defined by fastener 18 and lower arm 2.

A friction member comprising a sleeve composed of two U-shaped members 24 and 25 is fitted about arm 13 to provide frictional engagement with plates 14 and 15.

As in the previous embodiment, arm 13 is preferably formed from a hollow member so that wire 12 can be contained therein. At the joint shown in FIG. 4, the pivotally connected end of arm 13 is provided with aperture 34 to allow wire 12 access to the interior of the arm.

The illustrated embodiments of the present invention are shown attached to base 1. However, it will be understood that the adjustable stand structure of the present invention is not limited to such a base structure and may also be used with a base comprising a bracket or clamping member for attachment to a desk, wall or other surface.

Furthermore, while the illustrated embodiments show the adjustable stand of the present invention being used with a lamp housing, it will be understood that the stand can be used to support other assorted loads such as a microphone or magnifying glass.

Although the present invention has been described in some detail by way of example for purposes of clarity and understanding, it will be apparent that certain changes and modifications may be practiced within the scope of the appended claims.

I claim:

1. An adjustable stand comprising:
    a base with a pair of upstanding, spaced parallel friction plates;
    a single upstanding arm that extends between said parallel friction plates with a lower end pivotally attached between said friction plates and an upper end connected to a supported load, the lower end of said arm being dimensioned to permit pivotal movement between said friction plates and having a friction member comprising a enlarged sleeve fitted about said arm and dimensioned such that said sleeve is tightly and movably held between said friction plates;
    counterbalancing means extending externally of said arm between said arm and said base to substantially balance the weight of said arm and said supported load;
    whereby said counterbalancing means and said friction member act to ensure that said upstanding arm with its supported load will remain at any position to which said upstanding arm is adjusted.

2. An adjustable stand as claimed in claim 1 in which said supported load is a lamp housing.

3. An adjustable stand as claimed in claim 1 in which said supported load comprises a second pair of spaced friction plates attached to the upper end of said upstanding arm;
    a second arm pivotally connected at one end between said second set of friction plates, the opposite end being connected to a second supported load and the one end having a friction member adapted to engage said friction plates;
    counterbalancing means extending externally of said second arm between said second arm and said second set of spaced friction plates to substantially balance the weight of said arm and said second supported load.

4. An adjustable stand as claimed in claim 1 including adjusting means extending between said pair of friction plates to vary the distance between said plates in order to vary the frictional force on said friction member.

5. An adjustable stand as claimed in claim 4 in which said adjusting means comprises a threaded fastener.

6. An adjustable stand as claimed in claim 3 including adjusting means extending between said second pair of friction plates to vary the distance between said plates in order to vary the frictional force on said friction member.

7. An adjustable stand as claimed in claim 6 in which said adjusting means comprises a threaded fastener.

8. An adjustable stand as claimed in claim 1 or 3 including stop members extending between said pairs of friction plates to provide a limit to the pivotable travel of said arm between said pairs of friction plates.

9. An adjustable stand as claimed in claim 1 or 3 in which said arm is hollow and suitable for housing a wire.

* * * * *